(12) United States Patent
Harris

(10) Patent No.: US 8,761,280 B1
(45) Date of Patent: Jun. 24, 2014

(54) FRAGMENTATION CHANNELIZER

(76) Inventor: Fredric J. Harris, Spring Valley, CA (US)

( * ) Notice: Subject to any disclaimer, the term of this patent is extended or adjusted under 35 U.S.C. 154(b) by 74 days.

(21) Appl. No.: 13/253,082

(22) Filed: Oct. 5, 2011

Related U.S. Application Data

(60) Provisional application No. 61/405,197, filed on Oct. 20, 2010.

(51) Int. Cl.
*H04L 27/28* (2006.01)

(52) U.S. Cl.
USPC .......................................... 375/260; 375/259

(58) Field of Classification Search
USPC .................................................. 375/259, 260
See application file for complete search history.

(56) References Cited

U.S. PATENT DOCUMENTS

| | | | | |
|---|---|---|---|---|
| 6,230,122 B1* | 5/2001 | Wu et al. | | 704/226 |
| 6,393,451 B2* | 5/2002 | Leyonhjelm et al. | | 708/420 |
| 7,206,359 B2* | 4/2007 | Kjeldsen et al. | | 375/316 |
| 2001/0030940 A1* | 10/2001 | Hellberg | | 370/210 |
| 2002/0021715 A1* | 2/2002 | Matheus et al. | | 370/480 |
| 2002/0193075 A1* | 12/2002 | Lohr | | 455/61 |
| 2003/0231714 A1* | 12/2003 | Kjeldsen et al. | | 375/259 |
| 2005/0276335 A1* | 12/2005 | Kumar | | 375/260 |
| 2007/0286311 A1* | 12/2007 | Coyne et al. | | 375/340 |
| 2008/0095039 A1* | 4/2008 | Joo et al. | | 370/210 |
| 2008/0214114 A1* | 9/2008 | Orr | | 455/63.1 |
| 2009/0316568 A1* | 12/2009 | Harris et al. | | 370/203 |
| 2012/0063554 A1* | 3/2012 | Smith | | 375/350 |

* cited by examiner

*Primary Examiner* — Santiago Garcia
(74) *Attorney, Agent, or Firm* — Law Offices of Glenn R. Smith; Glenn R. Smith; Lisa L. Smith

(57) ABSTRACT

A fragmentation channelizer has a transmitter channelizing filter bank that fragments a continuous spectral span of a signal input into discrete spectral channels. The discrete spectral channels coincide with available bandwidth segments of a communications channel. A receiver has a receiver filter bank that inputs the discrete spectral channels after transmission over the communications channel and de-fragments the discrete spectral channels into a reconstructed continuous spectral span of the signal input so as to generate a signal output corresponding to the signal input.

13 Claims, 11 Drawing Sheets

FRAGMENTATION CHANNELIZER

PRIORITY CLAIM TO RELATED PROVISIONAL APPLICATIONS

The present application claims priority benefit under 35 U.S.C. §119(e) to U.S. Provisional Patent Application Ser. No. 61/405,197 filed Oct. 20, 2010, titled Fragmentation Channelizer; the above-cited provisional patent application is hereby incorporated in its entirety by reference herein.

SUMMARY OF THE INVENTION

A fragmentation channelizer has a transmitter channelizing filter bank that fragments a continuous spectral span of a signal input into discrete spectral channels. The discrete spectral channels coincide with available bandwidth segments of a communications channel. A receiver has a receiver filter bank that inputs the discrete spectral channels after transmission over the communications channel and de-fragments the discrete spectral channels into a reconstructed continuous spectral span of the signal input so as to generate a signal output corresponding to the signal input.

An aspect of a fragmentation channelizer is a signal input comprising a continuous spectral span. A transmitter filter bank fragments the spectral span into discrete spectral channels which coincide in frequency with available bandwidth segments of a communications channel. A receiver filter bank inputs the discrete spectral channels after transmission over the communications channel. The receiver filter bank de-fragments the discrete spectral channels into a reconstructed continuous spectral span so as to generate a signal output corresponding to the signal input.

In an embodiment, the transmitter filter bank has a transmitter analysis channelizer that decomposes the spectral span of the signal input into M discrete spectral channels that are relocated in frequency according to the available bandwidth segments of the communications channel. A transmitter synthesis channelizer forms a composite transmit signal from the relocated M discrete spectral channels, and the transmit signal is sent over the communications channel.

In another embodiment, the receiver filter bank receives a signal over the communications channel in response to the transmit signal. A receiver analysis channelizer inputs the received signal and reconstructs the M discrete spectral channels from the transmitter filter bank into a continuous spectral span. A receiver synthesis channelizer forms the signal output from the recomposed M discrete spectral channels.

In various other embodiments, each of the filter banks comprises a cascade of an M-to-2 down sampling channelizer and an M-to-2 up sampling channelizer. The M-to-2 down sampling channelizer has a M path filter in communications with an input commutator. A nM/2 point shift, M-point circular buffer is in communications with the M path filter, and a M point IFFT is in communications with the point shift, circular buffer. Similarly, the 2-to-M up sampling channelizer has an M point IFFT in communications with down sampling channelizer M point IFFT. A nM/2 point shift, M-point circular buffer is in communications with the up sampling M point IFFT. A M path filter is in communications with the point shift, circular buffer and a commutator in communications with the M path filter.

DETAILED DESCRIPTION OF THE PREFERRED EMBODIMENTS

Figure 1:
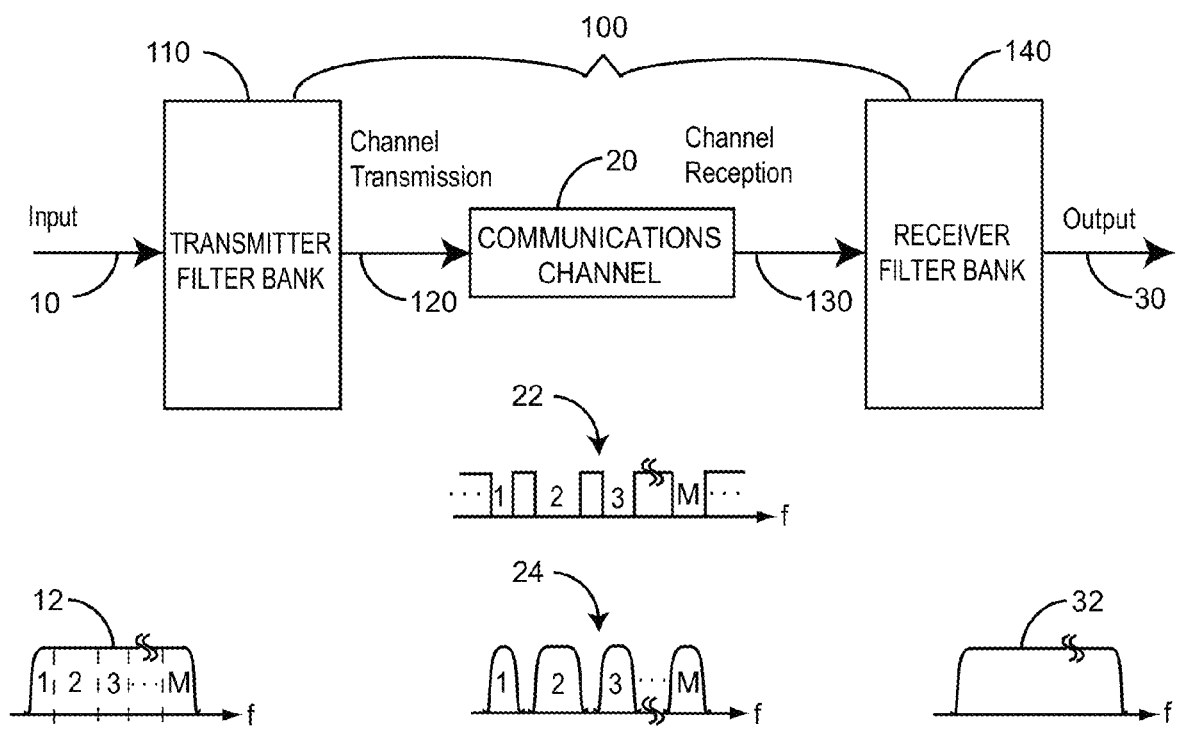
FIG. 1 is a general block diagram of a fragmentation channelizer.

FIG. 1 illustrates a fragmentation channelizer 100 having a transmitter filter bank 110 and a receiver filter bank 140. The fragmentation channelizer 100 advantageously utilizes available, non-contiguous spectral zones 22 of a communications channel 20 for communications of an input signal 10. In particular, a transmitter filter bank 110 fragments the input signal spectrum 12 into spectral segments 24 corresponding to the available zones 22. The fragmented spectrum 24 is transmitted 120 and received 130 over the communications channel 20 within the available spectral zones 22. The receiver filter bank 140 then reassembles the spectral segments 24 into an output signal 30 having the original spectrum 32.

Figure 2:
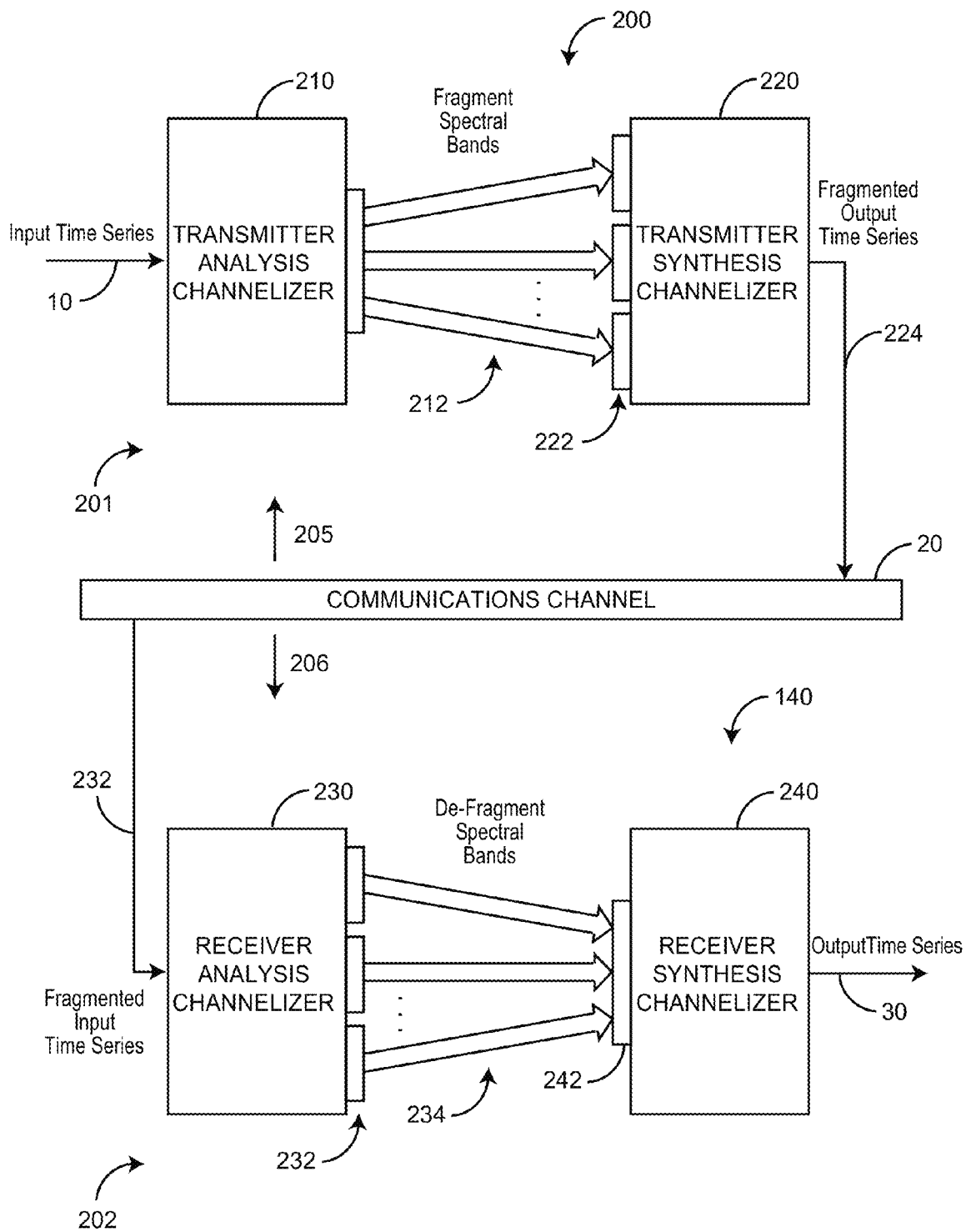
FIG. 2 is a block diagram of fragmentation channelizer embodiment having a transmitter cascade analysis and synthesis channelizer that fragments a spectrum and a receiver cascade analysis and synthesis channelizer that defragments the spectrum.

FIG. 2 illustrates a fragmentation channelizer 200 embodiment comprising a cascade of dual M-path analysis and synthesis blocks 201, 202, one on each side of a communication channel 20. On the communications-channel transmitter-side 205, an input signal 10 is processed by a transmitter analysis-synthesis channelizer pair 210, 220. A transmitter analysis channelizer 210 decomposes the spectral span containing the input signal spectrum 12 (FIG. 1) into M channels. The down-sampled time series from each of the channelizer ports that span the signal bandwidth are partitioned into segments 212 that define the spectral fragments. These segments 212 are passed to the input ports 222 of the synthesis channelizer 220 with channel bin offsets that define the non-contiguous frequency mapping. The synthesis channelizer 220 then forms the composite output time series 224 composed of the relocated spectral fragments, which is passed through the communications channel within the available spectral intervals.

On the communications-channel receiver-side 206, an output signal 30 is generated by a receiver analysis-synthesis channelizer pair 230, 240. The analysis channelizer 230 decomposes the spectral span containing the received signal spectrum 24 (FIG. 1) into M channels. The downsampled time series from each of the channelizer ports 232 that span the signal bandwidth are partitioned into segments 234 that match the spectral fragments formed at the transmitter. These segments 234 are passed to the input port 242 of the synthesis channelizer 240 with channel bin compensating offsets that map the non-contiguous frequency assignments back to their original parent spectral positions. The synthesis channelizer then forms an output signal 30 composed of the relocated, defragmented, spectral fragments. The process of fragmention and de-fragmention of the selected frequency segments at the transmitter and receiver are suggested by the tilted arrow lines connecting the analysis channelizers to the synthesis channelizers.

Figure 3A:
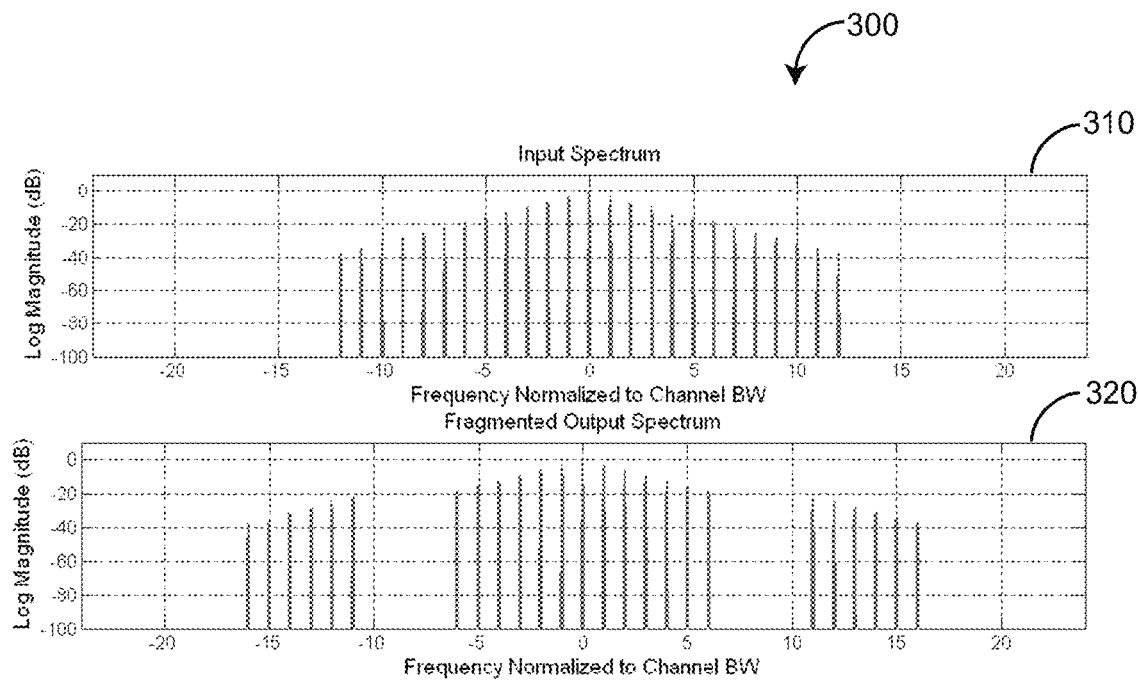
FIGS. 3A-B are spectral graphs of input and output spectra of the fragmentation process performed by first and second analysis-synthesis channelizer pairs, respectively.
Figure 3B:
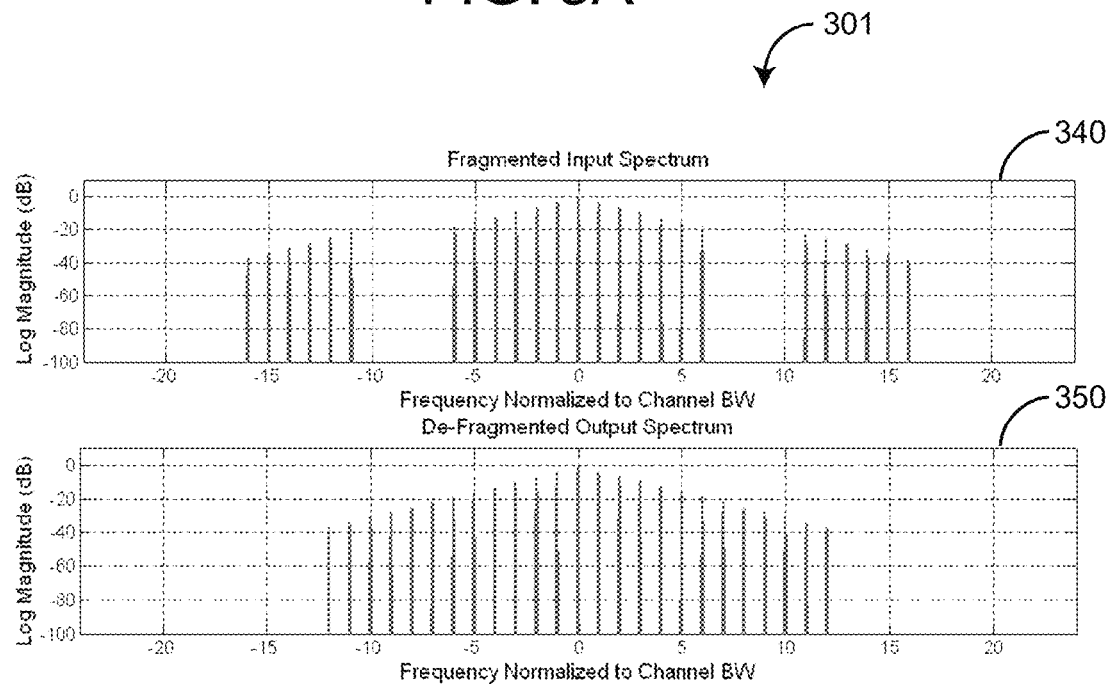

FIGS. 3A-B illustrate input spectra 300 and output spectra 301 of the fragmentation process performed by the transmitter analysis-synthesis channelizer pair 201 (FIG. 2) and receiver analysis-synthesis channelizer pair 202 (FIG. 2), respectively. As shown in FIG. 3A, the input signal spectrum 310 is formed by a set of 21 sinusoids delivered to the structure of FIG. 2. The transmitter channelizer pair fragments the transmitted signal spectrum 320 into three frequency bands. As shown in FIG. 3B, the receiver channelizer pair defragments the received signal spectra 340 presented to it from the communications channel so as to output the original set of 21 sinusoids 350.

Figure 4:
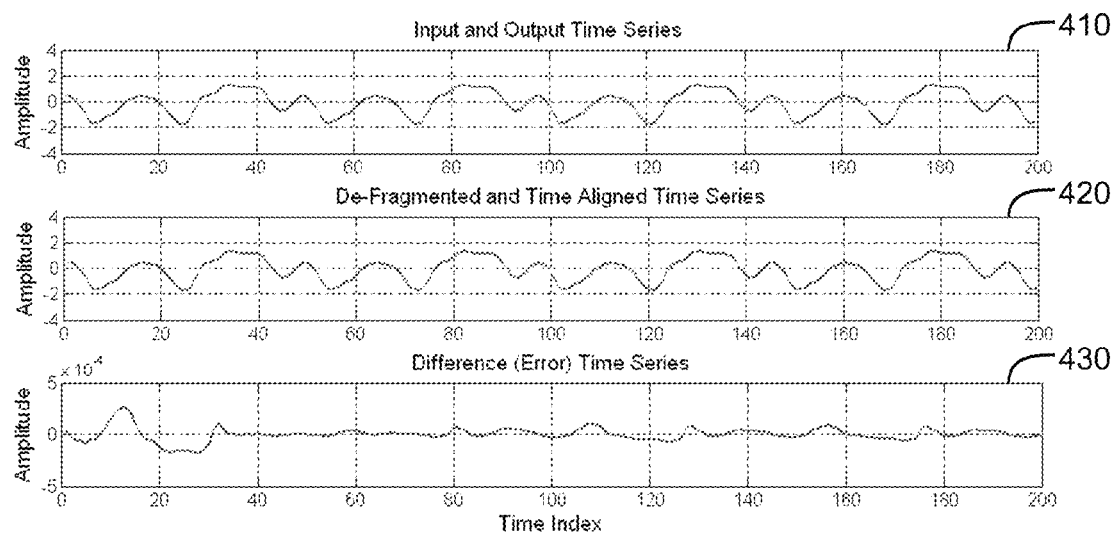
FIG. 4 are amplitude versus time graphs of the input and the time-aligned output time series for the fragmenting and de-fragmenting processes in addition to the difference of the two time series so as to illustrate the signal fidelity of the processes.

FIG. 4 illustrates the time series 410 applied to the fragmenting process and the reconstructed time series 420 formed by the de-fragmenting process. The time aligned difference between the two time series 430 is seen to be on the order of 70 dB below the signal levels.

Figure 5:
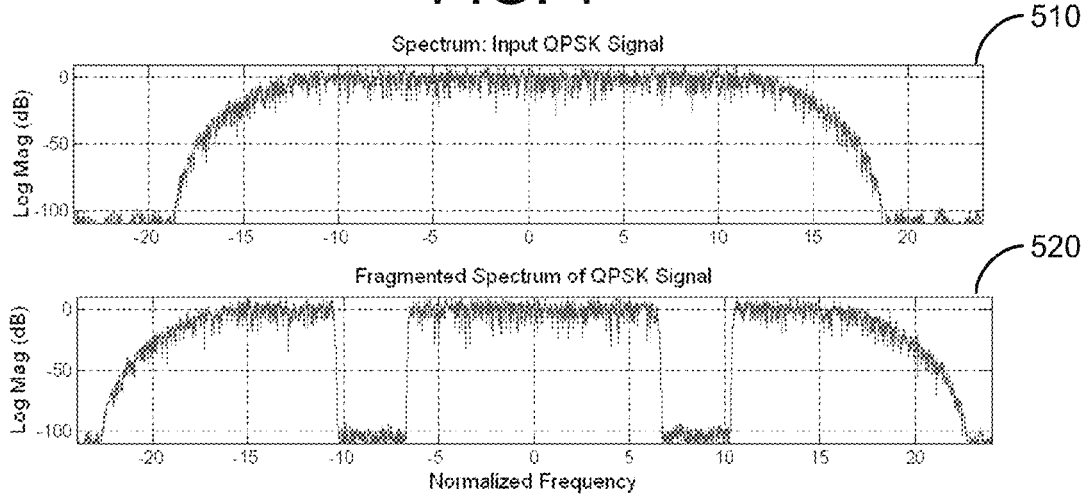
FIG. 5 are input and output spectra graphs for a QPSK signal that is fragmented by a transmitter analysis and synthesis filter bank.
Figure 6:
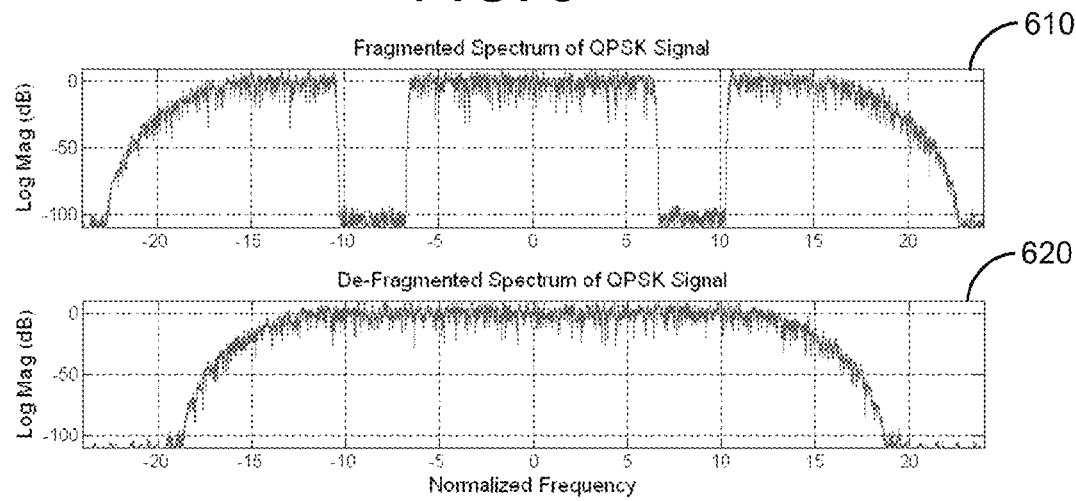
FIG. 6 are input and output spectra graphs for a fragmented QPSK signal that is de-fragmented by a receiver analysis and synthesis filter bank.
Figure 7:
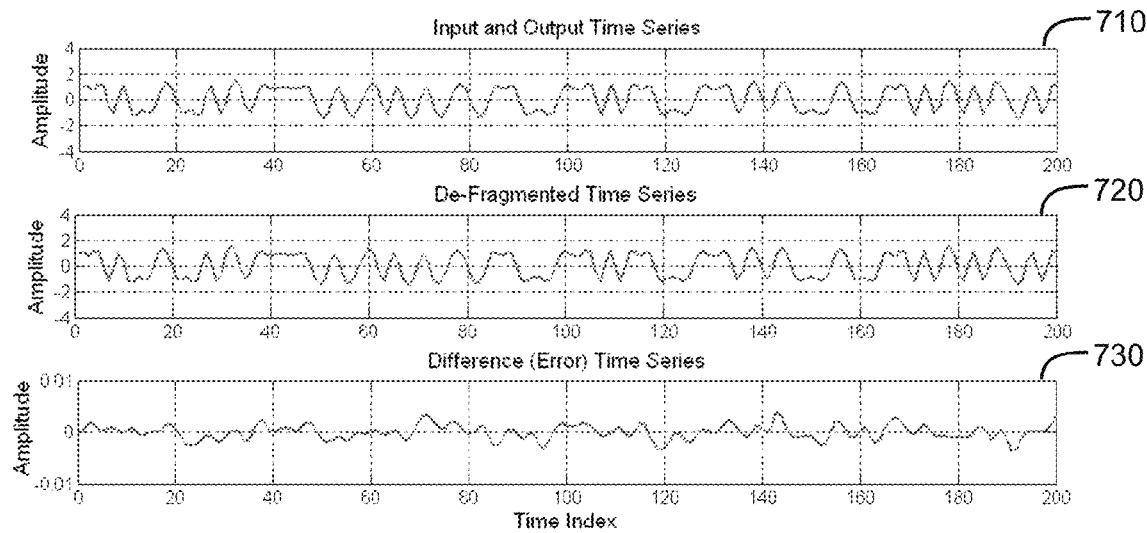
FIG. 7 are amplitude versus time graphs of input and time aligned output QPSK time series resulting from a fragmenting and de-fragmenting process and the corresponding difference of the two time series so as to illustrate the reconstruction error.
Figure 8:
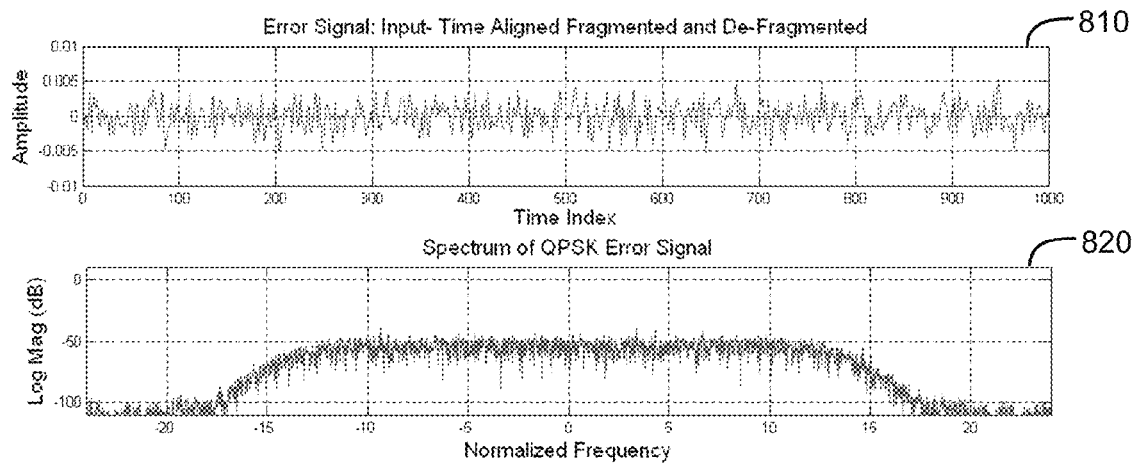
FIG. 8 are time and spectral graphs of the error time series and the error spectrum resulting from the fragmenting and de-fragmenting process for a QPSK time series.

FIGS. 5-10 illustrate the processing of a QPSK input signal and provide the most dramatic demonstration of the perfect reconstruction capabilities of the cascade analysis and synthesis process described with respect to FIGS. 1-2, above. FIG. 5 shows the spectra of the input 510 and output 520 of the fragmenting block at the transmitter side 205 (FIG. 2). FIG. 6 shows the spectra of the input 610 and output 620 of the de-fragmenting block at the receiver side 206 (FIG. 2). FIG. 7 shows the time series of the input 710 and output 720 of the spectral fragmenting and de-fragmenting process as well as the error signal 730 formed by the difference of the input and output signals. The error 730 is seen to be at least two orders of magnitude below the signal levels 710, 720. FIG. 8 further examines the error sequence 810 and shows the spectrum of the error signal 820. Comparing the error spectrum 820 to the input signal spectrum 510 (FIG. 5), the error is more than 55 dB below the signal.

Figure 9:
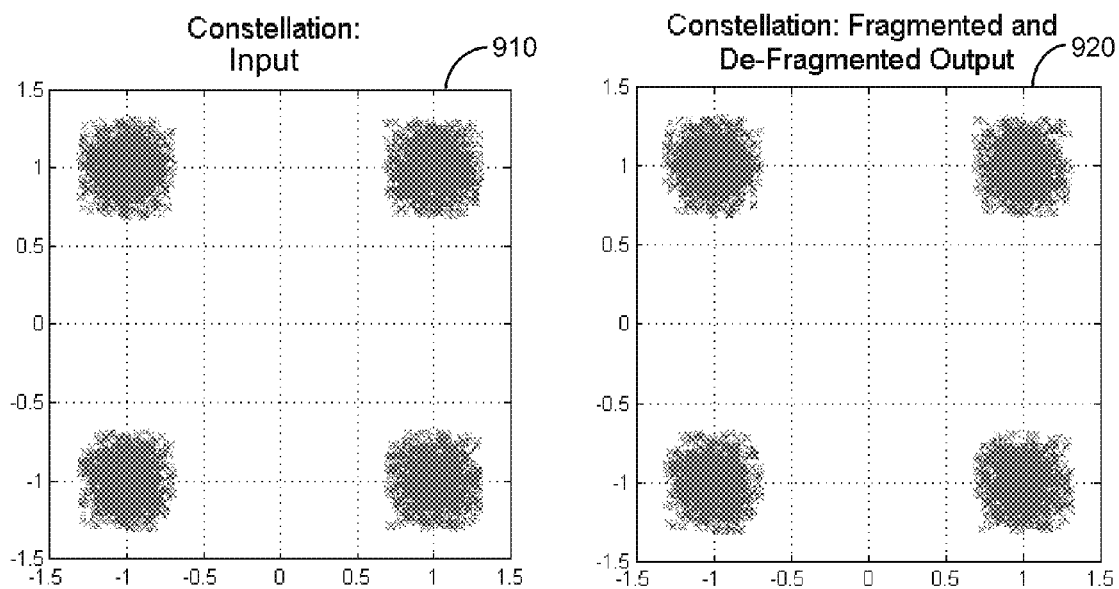
FIG. 9 are QPSK constellation plots for the modulator input to the fragmentation channelizer and the corresponding fragmentation channelizer output.
Figure 10:
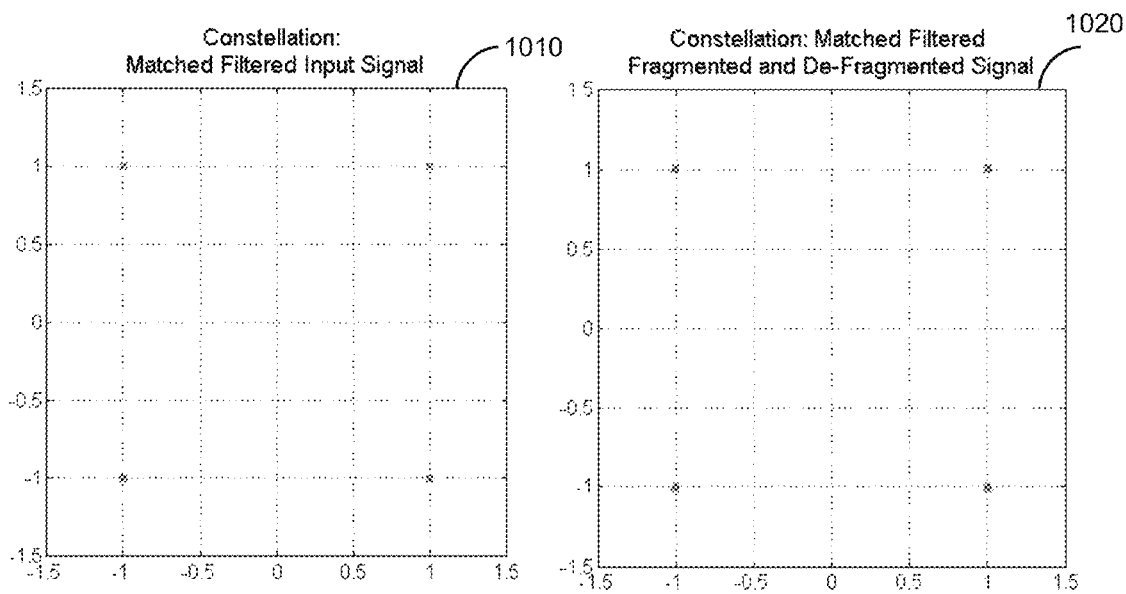
FIG. 10 are QPSK constellation plots for matched filter processing of the modulator input to the fragmentation channelizer and corresponding matched filter processing of fragmentation channelizer output.

FIGS. 9-10 further illustrate the fidelity of the fragmenting and de-fragmenting process. FIG. 9 is a QPSK constellation of the fragmentation/de-fragmentation process input 910 and output 920, respectively. FIG. 10 is a QPSK constellation from matched filtering of the fragmentation/de-fragmentation process input 1010 and output 1020, respectively. These two figures dramatically show that the signals processed by the fragmentation and de-fragmentation process are, except for time delay, indistinguishable from the non-processed version of the input signal. In fact the signal degradation is on the order of three orders of magnitude or better below the signal levels.

Figure 11:
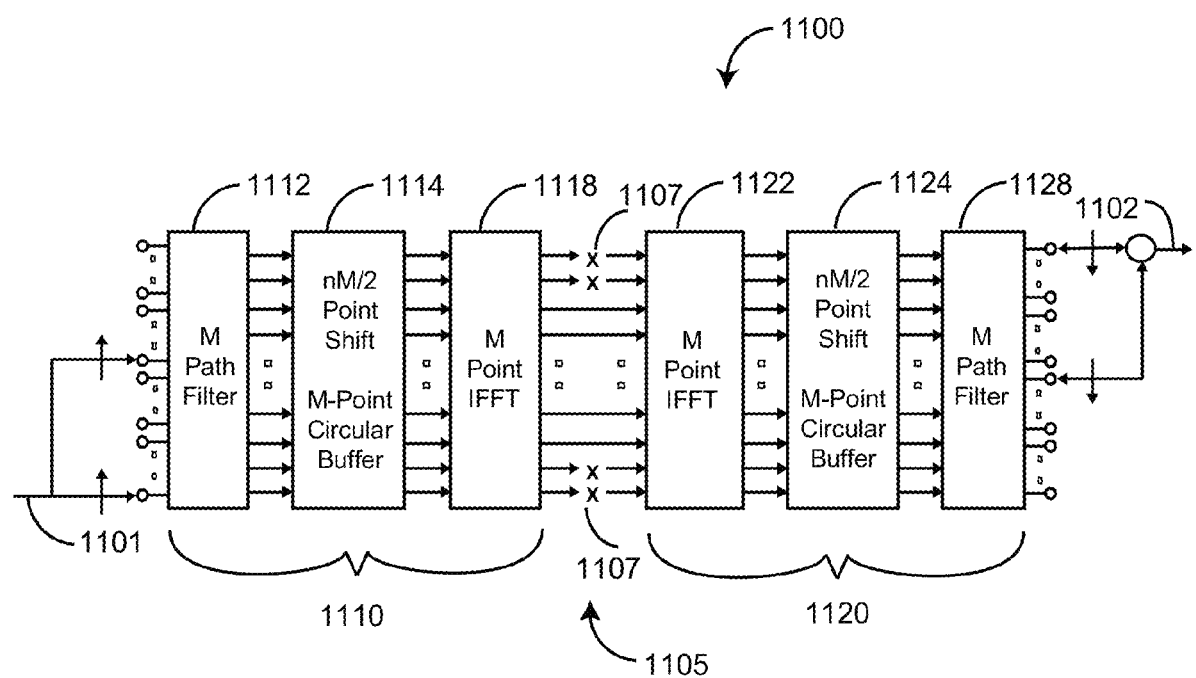
FIG. 11 is a block diagram of a cascade analysis and synthesis M-path filter bank.

FIG. 11 illustrates a cascade analysis-synthesis M-path filter bank 1100 embodiment of a fragmentation channelizer. The filter bank 1100 performs a channelized spectral analysis 1110 on an input signal 1101. The resulting channelized output time samples 1105 are then passed to the input ports of a channelized spectral synthesis engine 1120 to generate a synthesized output time series 1102 with the presented spectral components. If all the spectral bins are passed between the analysis 1110 and the synthesis 1120 engines, the output time series should precisely match the input time series except for the causality delay of the analysis filters and the synthesis filters. To demonstrate this, an impulse is applied to the input filter bank and all the frequency bins are passed from the analysis filter bank to the synthesis filter bank, as shown and described with respect to FIGS. 12-13, below. If a number of the spectral bins are disabled in the transfer between the two engines 1107, the engine synthesizes a variable and selectable bandwidth filter with low-pass or band-pass characteristics defined by the enabled ports between the two engine, as shown and described with respect to FIG. 14, below.

Figure 12:
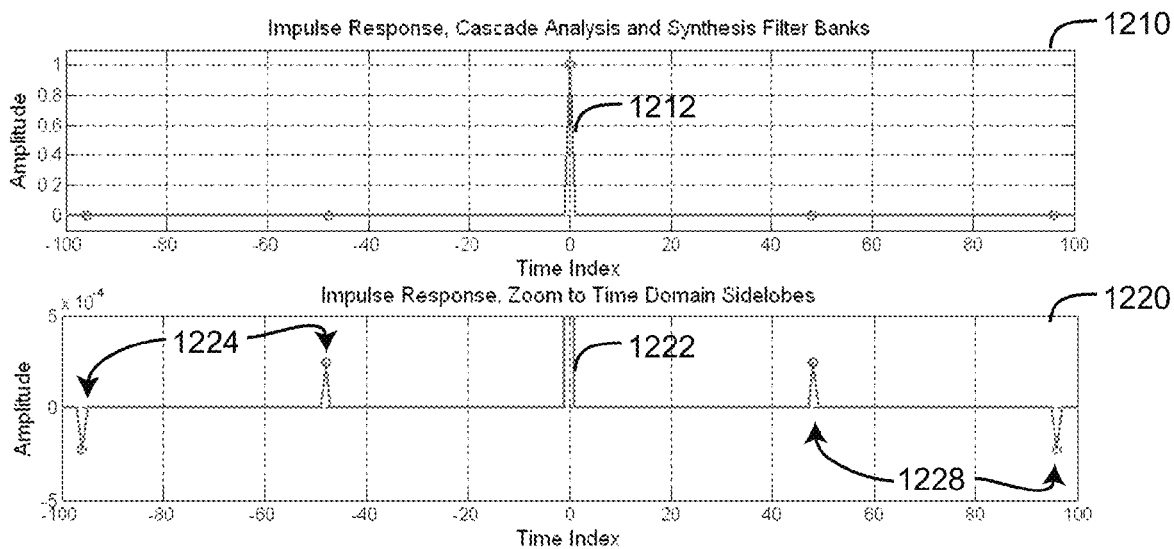
FIG. 12 are a time graph and a zoomed time graph of the impulse response of cascade analysis and synthesis illustrating channel artifacts due to channel boundaries of the composite filter.

FIG. 12 shows the impulse response 1210 of cascade channelizers 1100 (FIG. 11) with all spectral bins 1105 (FIG. 11) between the analysis filter bank and the synthesis filter bank enabled. As expected, an impulse 1212 at the input 1101 (FIG. 11) is replicated at the output 1101 (FIG. 11). The top subplot 1210 shows the impulse response at a scale that shows the amplitude of the impulse. The lower subplot 1220 zooms to very low levels, where we see that there are pre- and post echoes 1224, 1228 displaced by multiples of 48 time samples from the impulse with amplitudes on the order of $3 \times 10^{-4}$. These −70 dB artifacts are due to scalloping ripple in the pass band response of the composite filter bank 1100 (FIG. 11), as described with respect to FIG. 13, below.

Figure 13:
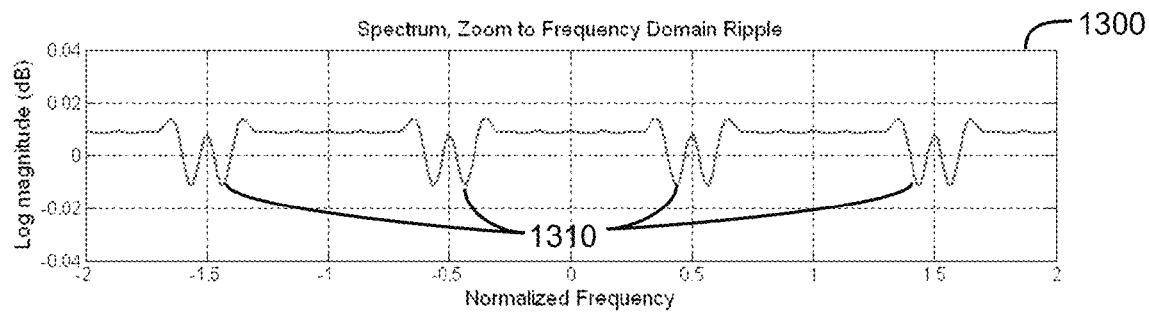
FIG. 13 is a spectral graph of the frequency domain scallop ripple at adjacent channels boundaries of a fragmentation channelizer.

FIG. 13 shows the spectral ripple at the channel boundaries 1300. The ripple level is on the order of 0.02 or 1/50-th of a dB. The scallop ripple 1310 is located at the boundaries between the channel filter responses. This artifact is controlled by careful design of a low pass filter embedded in the channelizers.

Figure 14:
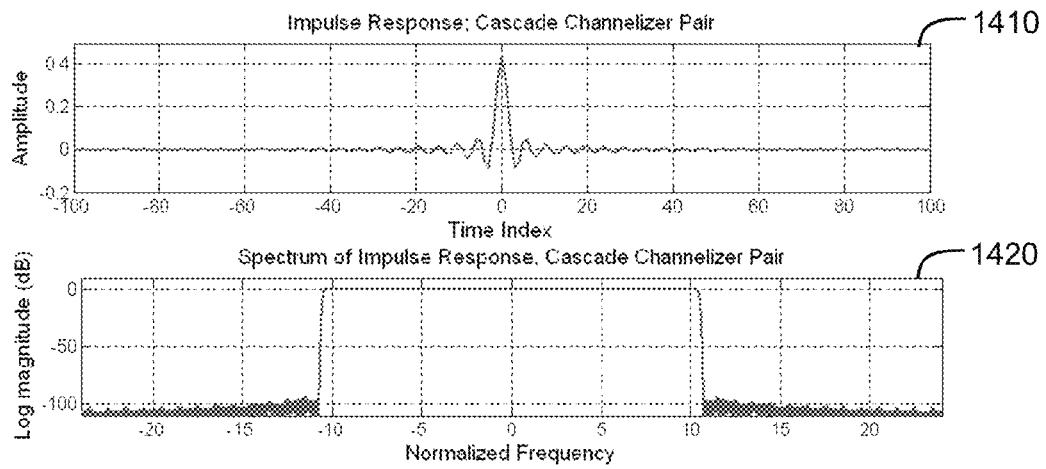
FIG. 14 are time and spectral graphs of the impulse response and frequency response for a 48 path analysis and synthesis filter bank with 21 out of 48 bins enabled between the input and the output filter bank.

FIG. 14 shows the impulse response 1410 and frequency response 1420 of a cascade 48-path analysis and synthesis channelizer 1100 (FIG. 11) embodiment with 21 out of 48 bins enabled between the analysis filter bank and the synthesis filter banks 1105 (FIG. 11). This channelizer embodiment contains approximately 670 taps, or 14 taps per path at the input port 1101 (FIG. 11) and 14-taps per path at the output port 1102 (FIG. 11). The channelizer performs a 24-to-1 down sample at the input 1101 (FIG. 11) and a 1-to-24 up sample at the output 1102 (FIG. 11).

Figure 15:
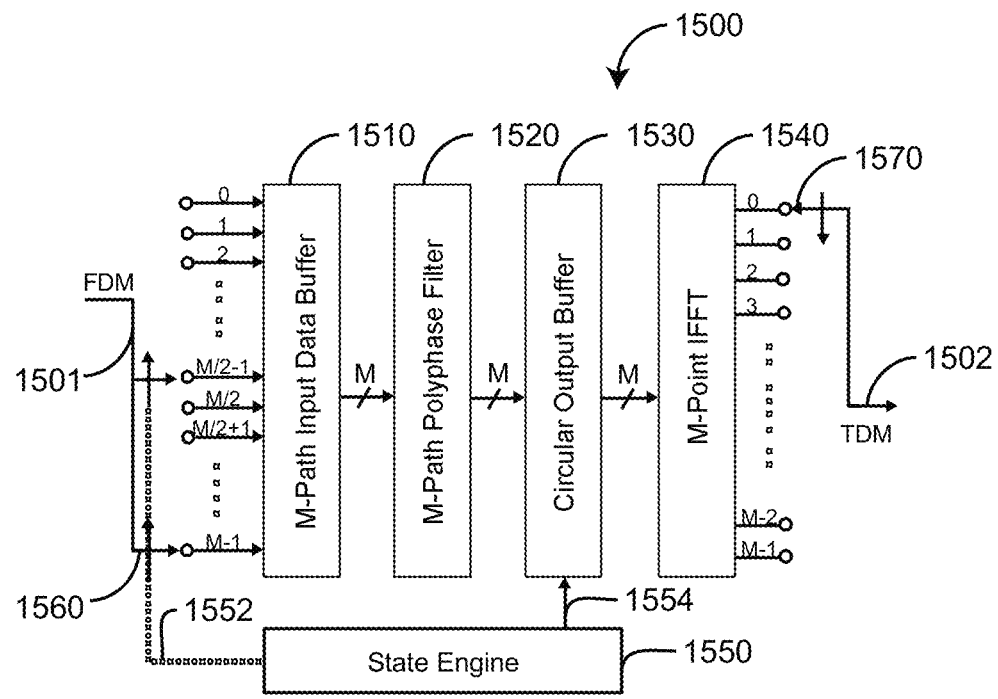
FIG. 15 is a block diagram of a modified analysis channelizer for M/2-to-1 down sampling.
Figure 16:
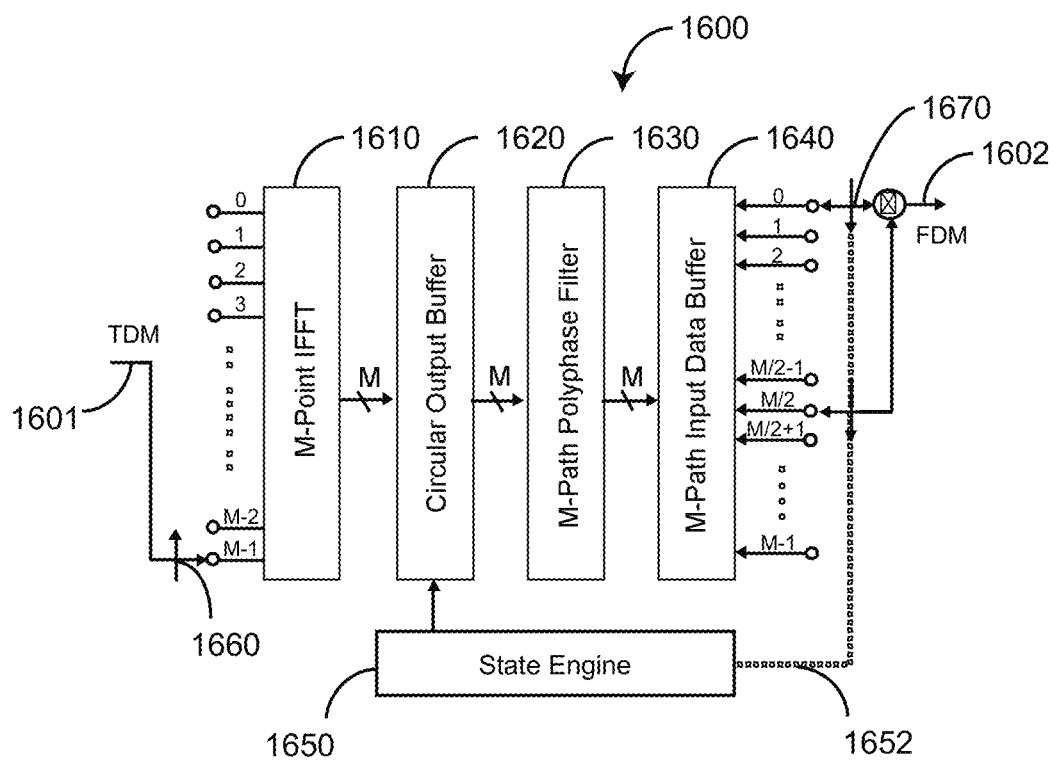
FIG. 16 is a block diagram of a modified analysis channelizer for 1-to-M/2 up sampling.

FIGS. 15-16 illustrate analysis channelizer 1500 and synthesis channelizer 1600 embodiments having 1-to-M/2 and M/2-to-1 resampling, respectively. In particular, an M-path polyphase down converter channelizer 1500 embodiment is advantageously reconfigured so as to be capable of performing a sample rate change from the input rate fs to the output rate 2 fs/M. The choice to use an M-to-2 down sampler offers the advantage that it avoids the spectral folding at the channel band edge for channel widths equal to the channel spacing. See FIGS. 21A-B, below.

FIG. 15 illustrates the form of the M-to-2 down sampler channelizer 1500. The input data buffer 1510 performs the correct data loading of the M/2 input samples 1501 into the M-path filter. The circular output buffer 1530 performs the time alignment of the shifting time origin of the input samples in the M-path filter 1520 with the non-shifting time origin of the phase rotator outputs of the IFFT 1540. The M/2 time sample shift of the input time series redefines the time origin and causes sinusoids with an odd number of cycles in the length M array to alternate sign on successive shifts. The alternating sign is the reason that the odd indexed frequency bins alias to the half sample rate while the even indexed frequency bins alias to DC. Rather than reverse phase of alternate output samples from the odd indexed bins, an M/2 point circular shift 1530 of alternate M-length vectors is performed before presenting the vector to the IFFT 1540. The circular shift applies the correct phase alignment to all frequencies simultaneously. There is not a circular shift of the buffer but rather an alternate data load into the IFFT 1540 input buffer.

Particular attention is paid in designing the low pass prototype filter used in the modified analysis channelizer. The input spectra of arbitrary bandwidth and spectral location located in the frequency domain spans numerous channel bandwidths of the analysis channelizer 1550. There is a need to collect and process all spanned channels corresponding to a single input bandwidth and assemble them without processing artifacts at the output of the next synthesizer block 1600. A SQRT Nyquist filter presents the interesting property that its band edge gain is 0.707 (or −3 dB). By using this filter as the low pass filter in the analysis channelizer 1500, M of them are placed across the whole spanned spectrum with each filter centered on k fs/M. All adjacent filters exhibit −3 dB overlap at their band-edges. The analysis channelizer 1500 working under this configuration is able to collect all the signals energy across its full operating spectrum range even if signals occupy more than one adjacent channel and reside in the channel's overlapping transition bandwidths.

Note that the SQRT Nyquist low-pass filter is designed with its two sided 3 dB bandwidth equal to 1/M-th of the channelizer input sampling frequency. This is equivalent to the filter impulse response having approximately M samples between its peak and first zero crossing and having approximately M samples between its zero crossings. The integer M is also the size of the IFFT as well as the number of channels in the M-to-2 channelizer. This low-pass filter also exhibits reasonable transition bandwidth and sufficient out of band attenuation or stop-band level. The analysis channelizer 1500 is designed for a dynamic range of 100 dB, the dynamic range of a 16-bit analog to digital converter. In an advantageous embodiment, in order to obtain a reasonable filter length that satisfies the design requirements, the Remez algorithm is used rather than MATLAB's rcosine routine to design the low-pass prototype SQRT Nyquist filter.

An M-path polyphase up converter channelizer 1600 is described below with respect to FIG. 16, which is capable of performing the sample rate change from the input rate 2·fs/M to the output rate fs. A 2-to-M up-sampler advantageously permits the input signal to be over-sampled by 2 and avoids the difficulty of having the sample rate precisely match the two-sided bandwidth of the input signals as well as permitting a shorter length channelizer filter due to an allowable wider transition bandwidth.

FIG. 16 illustrates the 2-to-M up-sampler synthesis channelizer 1600. An M-point IFFT 1610 applies the complex phase rotation to the separate baseband input signals as well as performs the initial 1-to-M up sampling of the input samples. The circular buffer 1620 following the IFFT performs the correct data offset of the two M/2 point halves of the IFFT output vector to maintain phase alignment with the M/2 channelizer output vector. The complex sinusoids output by the IFFT always define its time origin as the initial sample of its output vector. The output of the polyphase filter 1630 exhibits a time origin that shifts due to the M/2 time sample shift embedded in the output commutator 1670. The M/2 time sample shift of the output time series causes sinusoids with an odd number of cycles in the length M array to alternate sign on successive shifts. The alternating sign is the reason that the odd indexed frequency bins up convert to a frequency k+N/2 rather than frequency index k. Rather than reverse phase alternate input samples to the odd indexed IFFT bins, an M/2 point circular shift 1620 of alternate M-length vectors from the IFFT 1610 is performed. The circular shift applies the correct phase alignment to all frequencies simultaneously. Of course, there is not a circular shift of the buffer but rather an alternate data load from the IFFT output buffer 1610 into the polyphase filter 1630.

Particular attention is paid in designing the low pass filter used in the modified synthesis channelizer 1600. The input spectra are to be placed in randomly located positions in the frequency domain and their bandwidths can easily span and occupy more than one base-line channel. When an input signal bandwidth extends over multiple base-line channel widths it is decomposed by an input analysis filter that spans the number of input channels required to accommodate the wider bandwidth. These segmented channels are reassembled without processing artifacts at the output of the synthesizer block. The SQRT Nyquist filter presents the interesting property that it has a band edge gain of 0.707 (or −3 dB). By using this filter as the low pass prototype in our synthesis channelizer 1600, M of them are placed across the whole spanned spectrum with each filter centered on k fs/M. All adjacent filters exhibit −3 dB overlap at their band-edges. A synthesis channelizer 1650 working under this configuration is able to collect all the signals energy across its full operating spectrum range even if signals occupy more than one adjacent channel and reside in the channel's overlapping transition bandwidths.

Note that the SQRT Nyquist low-pass filter is designed with its two-sided 3 dB bandwidth equal to 1/M-th of the channelizer input sampling frequency. This is equivalent to the filter impulse response having approximately M samples between its peak and first zero crossing and having approximately M samples between its zero crossings. The integer M is also the size of the IFFT 1610 and also the number of channels in the M-to-2 channelizer 1500. The low-pass filter must also exhibit a reasonable transition bandwidth and sufficient out of band attenuation or stop-band level. This system is designed for a dynamic range of 80 dB, the dynamic range of a 16-bit processor. To obtain a reasonable filter length, the Remez algorithm is used rather than MATLAB's rcosine routine to design the low-pass SQRT Nyquist filter.

Figure 17:
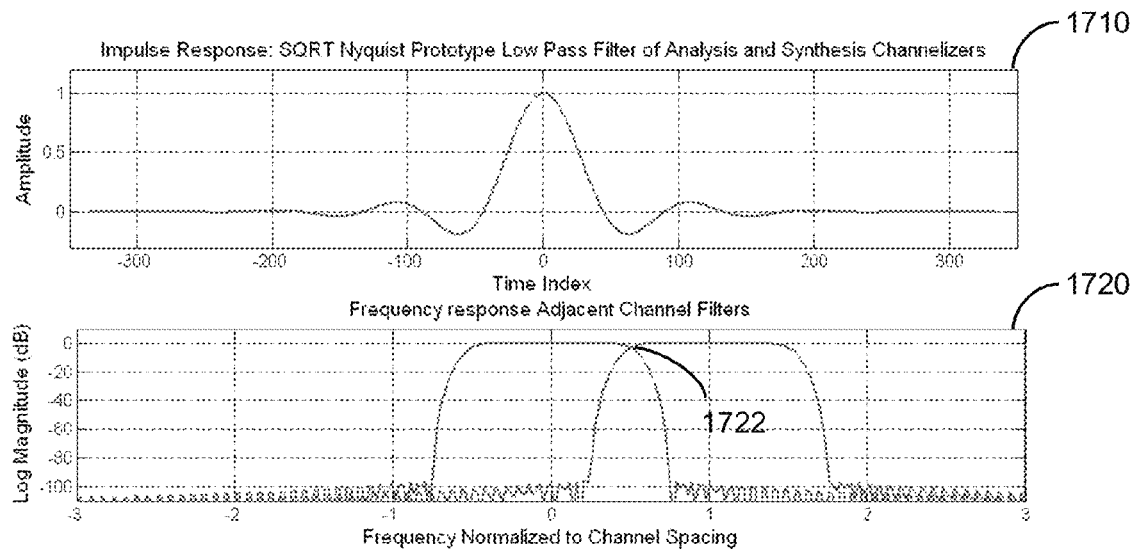
FIG. 17 are time and spectral graphs of impulse and frequency response for a prototype SQRT Nyquist low-pass filter designed for a 48-path channelizer.

FIG. 17 shows the impulse response 1710 and frequency response 1720 of the low-pass filter designed for a 48-path analysis and synthesis filter bank embodiment using the Remez algorithm. In the design process, the pass-band edge is shifted until the gain at the crossover point 1722 is $10*\log_{10}$ (0.5) dB. The design is not optimal but it is straightforward. The filter contains 671 taps that, when partitioned into the 48-path filter, places 14 weights in each path.

Figure 18:
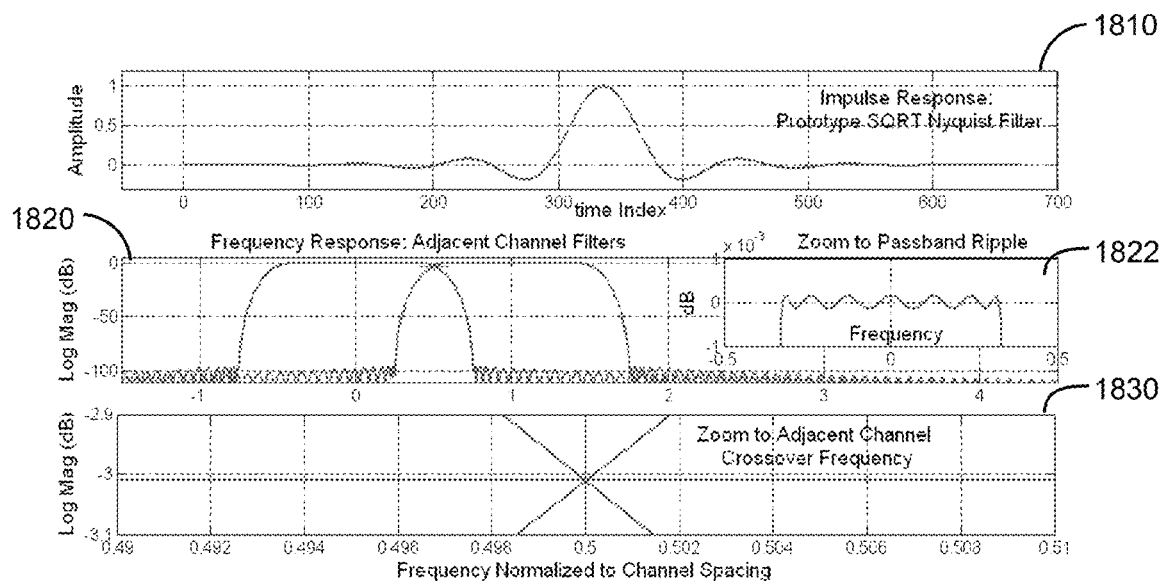
FIG. 18 are time and spectral graphs of impulse and frequency response for a prototype SQRT Nyquist low-pass filter designed for a 48-path channelizer zoomed to illustrate in band ripple level and illustrating a −3.0 db crossing level.

FIG. 18 shows the impulse response 1810 and frequency response 1820 of the same low-pass filter designed for a 48-path analysis and synthesis filter bank using the Remez algorithm. Here, a zoom to specific frequency intervals 1822, 1830 provides a better look at the filter characteristics. In the center subplot 1822 we see a pass-band ripple of approximately $10^{-4}$ dB. In the bottom subplot 1830 we see the crossover gain between adjacent channelizer filters at the –3.01 dB level.

Figure 19:
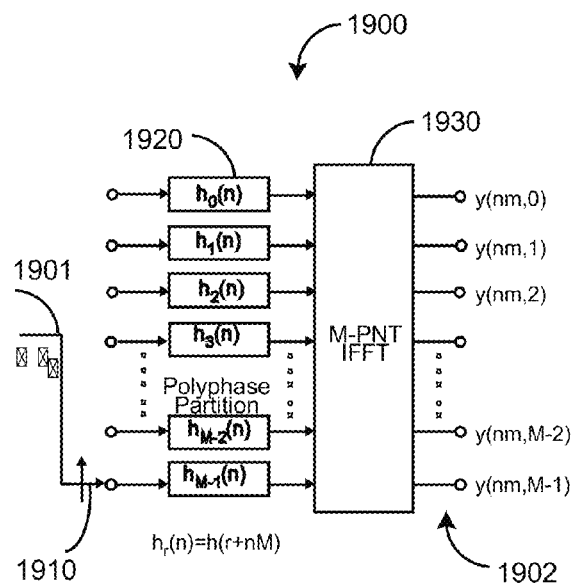
FIG. 19 is a block diagram of an M-path down sampling polyphase analysis filter bank embodiment.
Figure 20:
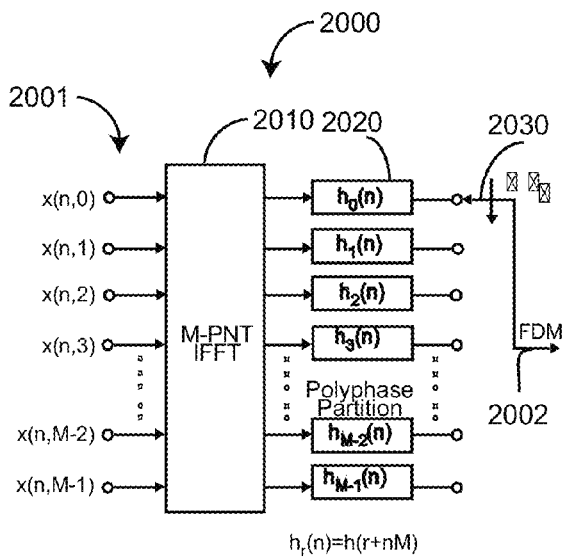
FIG. 20 is a block diagram of an M-path up sampling polyphase synthesis filter bank embodiment.

FIGS. 19-20 illustrate an M-path down-sampling filter bank 1900 and an M-path up-sampling filter bank 2000, respectively. Digital signal processing based filter banks are deeply entrenched in the communications community. Most filter banks are implemented as M-path polyphase channelizers whose structures are well understood. The channelizer operates in two distinct modes—the analysis mode 1900 and the synthesis mode 2000. The analysis mode 1900 is equivalent to a bank of digital down converters (DDC) that extract the spectra of multiple narrow band signals from their various positions along the frequency axis and translate each spectral band to baseband or zero frequency. The synthesis mode 2000 is equivalent to a bank of digital up converters (DUO) that accepts multiple narrowband baseband signals at their appropriate sample rate, raises their individual sample rates to a common output sample rate and digitally translates the spectra of each signal from baseband to various spectral region in the frequency span supported by the increased sample rate.

The two operating modes, analysis and synthesis, are seen to be each other's inverse operation. Their implementations reflect their inverse relationship by having dual block diagrams 1900, 2000 and of course dual signal flow graphs. Advantageously, an analysis channelizer engine operating as a M/2-to-1 down-sampler and a synthesis channelizer engine operating as a 1-to-M/2 up-sampler, respectively, can be coupled as a perfect reconstruction filter bank, as described with respect to FIGS. 11, 15 and 16 above. In a DDC analysis channelization process, the bandwidth reduction associated with the channel separation and translation is accompanied by a commensurate reduction in sample rate from the rate appropriate for the composite bandwidth to the rate appropriate for each isolated channel. The input signal being processed has a composite two-sided bandwidth and a sample rate which exceeds the two-sided bandwidth. The relationship between two-sided bandwidth and the required sample rate is established by the Nyquist sampling criterion, as described with respect to FIGS. 21A-B, below.

FIG. 19 illustrates the complete structure formed by an M-port commutator 1910, an M-path partitioned low-pass filter 1920 and an M-point inverse discrete Fourier transform (IDFT) 1930 block. A polyphase down-sampling channelizer simultaneously down converts and down samples M equally spaced, fixed bandwidth signals. For computational efficiency the IDFT is implemented with the IFFT algorithm.

In this engine, a commutator 1910 delivers M consecutive samples to the M input ports of the M-path filter 1920 performing the signal sample rate reduction which causes M spectral folds in the frequency domain. With an output sample rate of $f_S/M$, all M multiples of the output sample rate alias to baseband (DC). The alias terms in each arm of the M-path filter 1920 exhibit unique phase profiles due to their distinct center frequencies and to the time offsets of the different down-sampled time series delivered to each commutator port. In particular, each of the aliased terms exhibits a phase shift equal to the product of its center frequency k with its path time delay r. These phase shifts are shown in EQ. 1 where $f_S$ is the sample rate at the input to the polyphase down sampler.

$$\varphi(r, k) = -\omega_k \Delta T_r = -2\pi \frac{f_s}{M} k r T_s = -\frac{2\pi}{M} r k \quad (1)$$

The partitioned M-path filter 1920 aligns the time origin of the sampled data sequences delivered by the input commutator 1910 to a single common output time origin. This task is accomplished by the all-pass characteristics of the M-path partitioned filter that apply the required differential time delay to the individual input time series. Finally the IFFT block 1930 performs the equivalent of a beam-forming operation, i.e. the coherent summation of the time aligned signals at each output port with a selected phase profile.

The phase coherent summation of the outputs of the M-path filters separates the various aliases residing in each path by constructively summing the selected aliased frequency components located in each path, while simultaneously destructively canceling the remaining aliased spectral components. The IFFT block 1930 extracts, in each arm 1920, from the myriad of aliased signals only the alias with the particular matching phase profile.

Summarizing, three operations performed by a polyphase down converter embodiment are: sample rate change, due to the input commutator 1910; bandwidth reduction, due to the M-path partitioned filter weights 1920; and Nyquist zone selection, due to the IFFT block 1930. These three operations are completely independent of each other and can be modified to achieve different goals for both the transmitter 1900 and the receiver 2000 (FIG. 20). A channelizer embodiment is critically sampled with channel spacing, channel bandwidth and output sample rate equal to $f_S/M$. This causes the transition band edges of the channelizer filters to alias onto itself which would prevent use of the next processing step. Hence, a first advantageous change to the channelizer embodiment described above is to double the output sample rate without changing the channel bandwidth or channel spacing. In doing so the sample rate will be twice the bandwidth of the prototype filters as well as twice the channel spacing.

FIG. 20 shows the complete structure formed by an M-point inverse discrete Fourier transform (IDFT) 2010, an M-path partitioned low-pass filter 2020 and an M-port commutator 2030. A polyphase up-sampling channelizer, the dual of the down sampling channelizer 1900 (FIG. 19), simultaneously up-samples and up-converts M equally spaced, fixed bandwidth signals. For computational efficiency the IDFT 2010 is implemented with the IFFT algorithm.

In this engine, an M-point IFFT 2010 performs two simultaneous tasks: an initial up-sample of 1-to-M, forming an M-length vector for each input sample x(n,k); and a complex phase rotation of k cycles in M-samples on the up-sampled output vector. The IFFT 2010 generates a weighted sum of complex vectors containing integer number of cycles per M-length vector. The polyphase filter 2020 forms a sequence of column coefficient weighted, MATLAB's dot-multiply, versions of these complex spinning vectors. The sum of these columns, formed by the set of inner products in the polyphase partitioned filter 2020, is the shaped version of the up-converted M-length vector output from the IFFT 2010. The M-port commutator 2030 delivers M consecutive samples from the output ports of the M-path filter to deliver the 1-to-M interpolated, up-converted and shaped time series formed by the synthesizer channelizer 2000.

Summarizing, the three operations performed by a polyphase up converter embodiment are: digital up conversion to selected Nyquist zones by the IFFT 2010; spectral shaping and filtering due to the M-path partitioned filter weights 2020; and sample rate change due to the M-port output commutator 2030. These three operations are completely independent of each other and can be modified to achieve different goals for both of the receiver and transmitter. This receiver channelizer 2000 embodiment is critically sampled with channel spacing, channel bandwidth, and input sample rate equal to $f_S$. The input signals to the up converter channelizer are shaped external to the channelizer. The sample rate of the shaped signal satisfies the Nyquist criterion. Shaping filters often operate at 2-samples per symbol for ease of signal generation while satisfying the Nyquist criterion. The minimum band center of a channelizer is advantageously matched to the 2-sided bandwidth of the input signal, not to its symbol rate or twice its symbol rate. To more easily accommodate the channel spacing requirement, the input sample rate is advantageously made twice the 2-sided bandwidth of the input signal rate without changing the channel bandwidth or channel spacing. In doing so, the input sample rate will be twice the bandwidth of the prototype filters as well as twice the channel spacing.

Figure 21A:
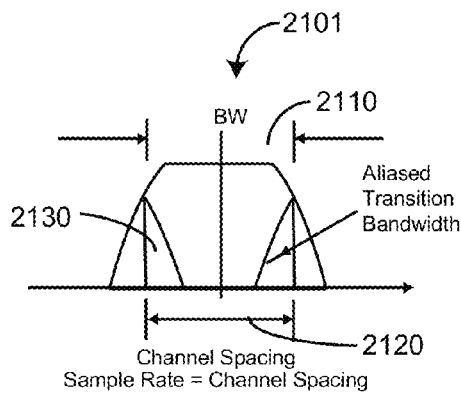
FIGS. 21A-B are spectral graphs illustrating two possible sample rates relative to channel spacing and channel bandwidth.
Figure 21B:
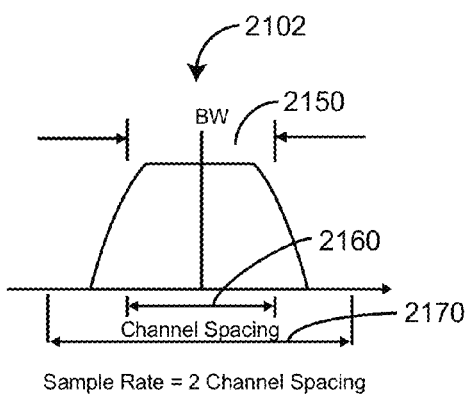

FIGS. 21A-B show two possible relationships between channel bandwidth, channel spacing, and output or input sample rate. The options are seen to be a sample rate equal to channel bandwidth 2110 and the channel spacing 2120 or a sample rate 2170 greater than the channel bandwidth 2150 and the channel spacing 2160. In an advantageous embodiment, to satisfy the Nyquist criterion for the channel bandwidth with transition bandwidth extending beyond channel bandwidth, the sample rate is selected to be greater than channel spacing. In a particularly advantageous embodiment, a channelizer is designed to process input or output samples at $f_S=2 \cdot f_C$ (FIG. 21B) while preserving the channel spacing at $f_C$ with the channel filter 3-dB bandwidth also equal to $f_C$. This restriction avoids the aliasing 2130 of the filter band edge that occurs when the sample rate is equal to the channel filter 3-dB bandwidth.

A fragmentation channelizer has been disclosed in detail in connection with various embodiments. These embodiments are disclosed by way of examples only and are not to limit the scope of the claims that follow. One of ordinary skill in art will appreciate many variations and modifications.

What is claimed is:

1. A fragmentation channelizer comprising: a signal input; a transmitter filter bank that fragments a continuous spectral span of the signal input into a plurality of spectral channels;
the spectral channels coinciding in frequency with available non-continuous bandwidth segments of a communications channel; and
a receiver filter bank that inputs the discrete spectral channels after transmission over the communications channel; and
the receiver filter bank de-fragments the discrete spectral channels into a reconstructed continuous spectral span of the signal input so as to generate a signal output corresponding to the signal input;
wherein the transmitter filter bank comprises a transmitter analysis channelizer that decomposes the spectral span of the signal input into M spectral channels that are relocated in frequency according to the available bandwidth segments of the communications channel; and
a transmitter synthesis channelizer that forms a composite transmit signal from the relocated M spectral channels, where the transmit signal is sent over the communications channel.

2. The fragmentation channelizer according to claim 1 wherein the receiver filter bank comprises:
a receive signal received over the communications channel in response to the transmit signal;
a receiver analysis channelizer that inputs the receive signal and recomposes the M spectral channels into a continuous spectral span; and
a receiver synthesis channelizer that forms the signal output from the recomposed M spectral channels.

3. The fragmentation channelizer according to claim 2 wherein each of the transmitter filter bank and the receiver filter bank comprise a cascade of an M-to-2 down sampling channelizer and an M-to-2 up sampling channelizer.

4. The fragmentation channelizer according to claim 3 wherein the M-to-2 down sampling channelizer comprises:
an input commutator;
a first M path filter in communications with the input commutator;
a first nM/2 point shift, M-point circular buffer in communications with the first M path filter;
a first M point IFFT in communications with the first point shift, circular buffer.

5. The fragmentation channelizer according to claim 4 wherein the 2-to-M up sampling channelizer comprises:
a second M point IFFT in communications with the first M point IFFT;
a second nM/2 point shift, M-point circular buffer in communications with the second M point IFFT;
a second M path filter in communications with the second point shift, circular buffer; and
a second commutator in communications with the second M path filter.

6. A fragmentation channelizing method comprising:
inputting an input signal having an input signal spectrum;
fragmenting the input signal spectrum into a transmitter signal spectrum having a plurality of spectral segments;
transmitting the transmitter signal spectrum as a transmitter signal over a communications-channel having available spectral zones corresponding to the spectral segments;
receiving a receiver signal from the communications-channel responsive to the transmitter signal, the receiver signal having a receiver signal spectrum; and defragmenting the receiver signal spectrum into an output signal responsive to the input signal;
wherein the fragmenting comprises:
decomposing the input signal spectrum into M transmitter time-series channels that span the input signal spectrum;
partitioning the M transmitter time-series channels into transmitter partitioned channels according to the discrete spectral segments; and
offsetting the M transmitter time-series channels so as to map the transmitter partitioned channels to the spectral segments.

7. The fragmentation channelizing method according to claim 6 wherein the defragmenting comprises:
decomposing the receiver signal spectrum into M receiver time-series channels that span the receiver signal spectrum;
partitioning the M receiver time-series channels into a plurality of receiver partitioned channels;
offsetting the M receiver time-series channels so as to map the receiver partitioned channels back to the input signal spectrum.

8. The fragmentation channelizer method according to claim 7 wherein decomposing the input signal spectrum and decomposing the receiver signal spectrum each comprise:
loading M/2 input samples into an M-path filter; and
time aligning a shifting time origin of the input samples with a non-shifting time origin of phase rotators outputs of an M-point inverse FFT.

9. The fragmentation channelizer method according to claim 8 wherein decomposing the input signal spectrum and decomposing the receiver signal spectrum each further comprise time division multiplexing the M-point inverse FFT output as a time series.

10. The fragmentation channelizer method according to claim 7 wherein offsetting the M transmitter time-series channels and offsetting the M receiver time series channels each comprise:
performing an initial 1-to-M up sampling to the time series channels; and
applying a complex phase rotation to each of the time-series channels.

11. The fragmentation channelizer method according to claim 10 further comprising correcting phase alignment of all frequencies of the time-series channels simultaneously.

12. The fragmentation channelizer comprising:
an first input commutator means for loading M/2 input samples into a M-path data buffer;
a first M-path filter in communications with the data buffer;
a first IFFT means for applying phase rotators to the input samples;
a first circulator buffer means for aligning shifting time origins of the input samples to the phase rotators, the first circulator buffer means in communications with the first M-path filter; and
a first output commutator means for generating an analysis channelizer output.

13. The fragmentation channelizer according to claim 12 further comprising:
a second input commutator means for performing a 1-to-M up sampling;
a second IFFT means for applying phase rotators to the up sampling;
a second circular buffer means for correcting phase alignment;
an second M-path filter;
an second output commutator means for generating a synthesis channelizer output.

* * * * *